H. A. TUTTLE.
REVERSE GEARING.
APPLICATION FILED AUG. 29, 1907.

901,664.

Patented Oct. 20, 1908.

2 SHEETS—SHEET 1.

Witnesses:
H. B. Davis.
E. A. Jordan

Inventor:
Henry A. Tuttle
by Noyes & Harrison
Attys

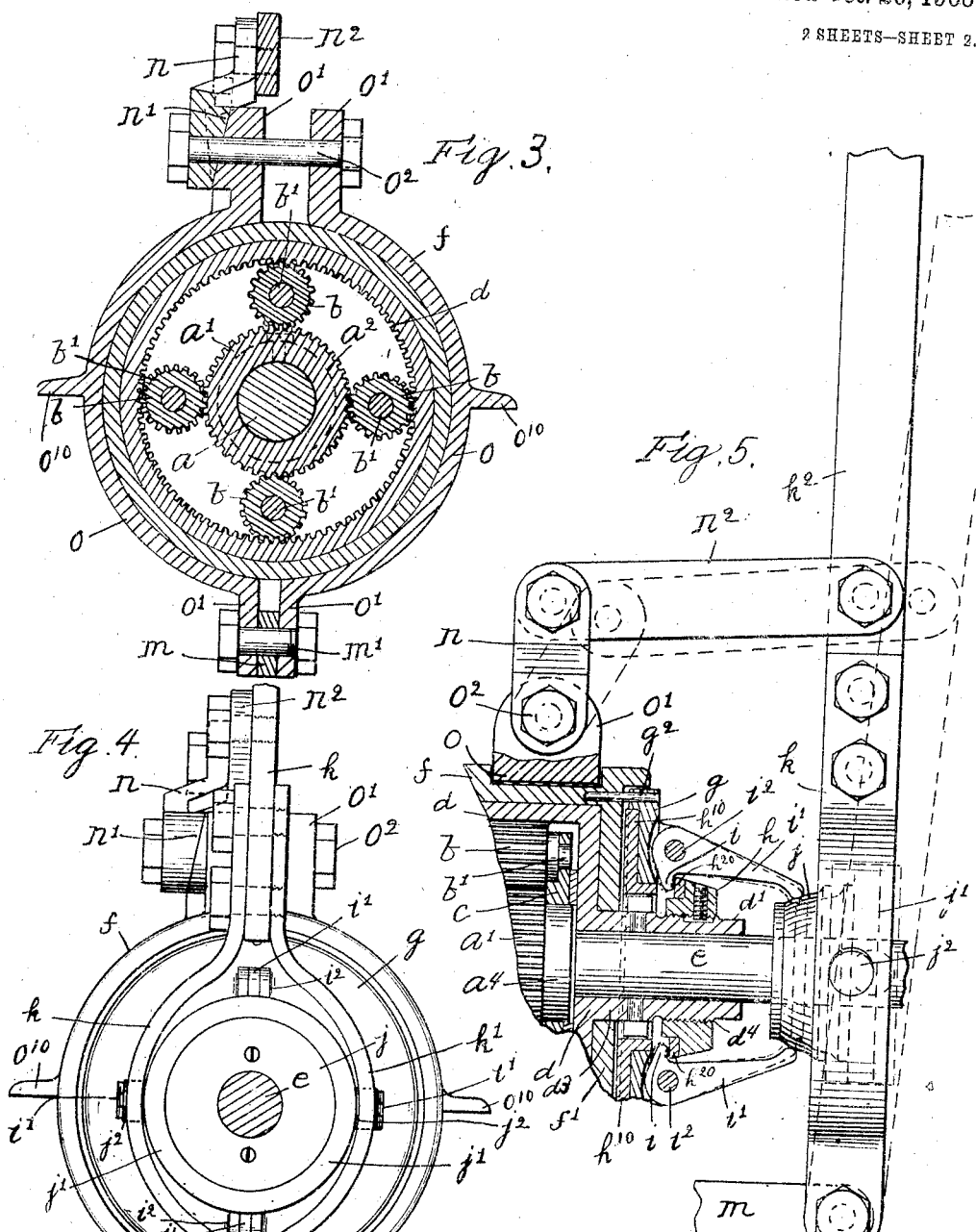

UNITED STATES PATENT OFFICE.

HENRY A. TUTTLE, OF TAUNTON, MASSACHUSETTS, ASSIGNOR TO EVANS STAMPING AND PLATING CO., OF TAUNTON, MASSACHUSETTS, A CORPORATION OF MASSACHUSETTS.

REVERSE-GEARING.

No. 901,664.

Specification of Letters Patent.

Patented Oct. 20, 1908.

Application filed August 29, 1907. Serial No. 390,566.

*To all whom it may concern:*

Be it known that I, HENRY A. TUTTLE, of Taunton, county of Bristol, State of Massachusetts, have invented an Improvement in Reverse-Gearing, of which the following description, in connection with the accompanying drawings, is a specification, like characters on the drawings representing like parts.

This invention relates to reverse gearing connecting a continuously rotating shaft with another shaft, whereby the latter may be driven forwards or backwards or may remain idle; and has for its object to improve the construction of the same, whereby the parts may be very compactly arranged and easily assembled and the whole well balanced for easy and effective operation.

Figure 1:
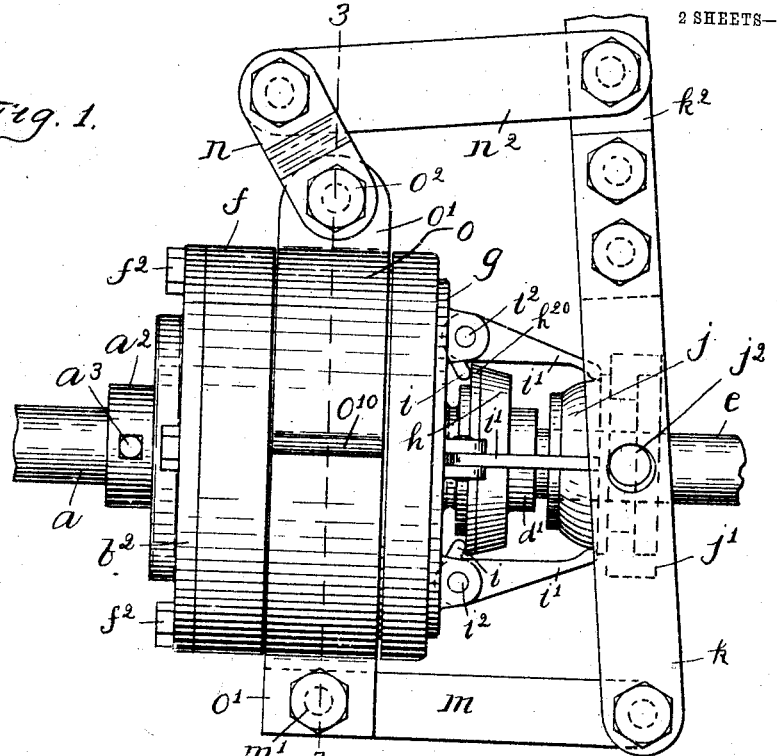
Figure 2:
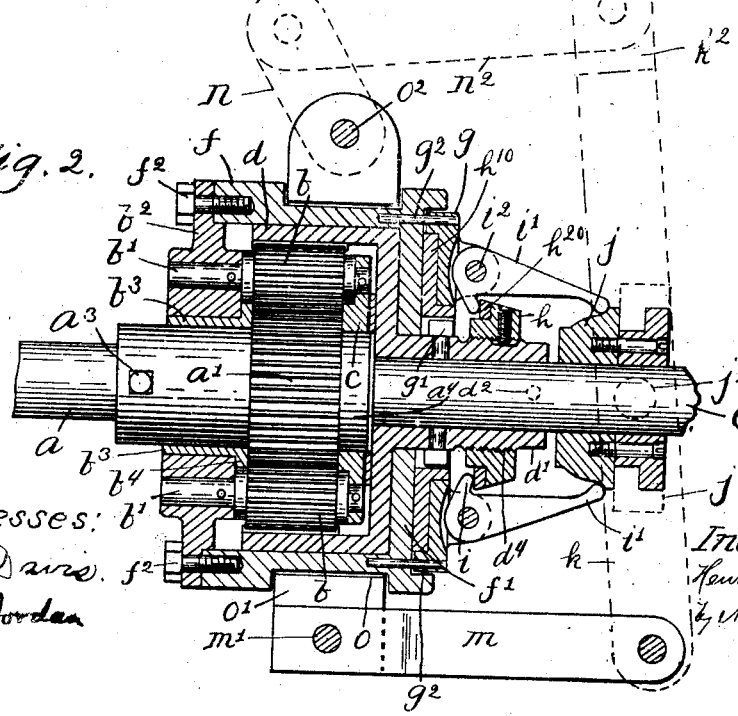

Figure 1 is a side elevation of a reverse gearing embodying this invention. Fig. 2 is a longitudinal vertical section of the reverse gearing shown in Fig. 1. Fig. 3 is a transverse section of the reverse gearing shown in Fig. 1, taken on the dotted line 3—3. Fig. 4 is an end view of the reverse gearing. Fig. 5 is a detail showing particularly the actuating lever in different positions.

$a$ represents the driving shaft, which is adapted to be connected with an engine or motor of any suitable description. A spur gear $a'$ is secured to this shaft. This gear has an elongated hub $a^2$ at one side of it through which a set screw $a^3$ passes for securing it to the shaft, and has at the opposite side of it a short hub $a^4$. The driving shaft $a$ terminates approximately flush with the end of the short hub $a^4$. The spur gear $a'$ engages several pinions $b$, which are arranged about it, four being herein shown, and said pinions are mounted to revolve freely on studs $b'$ fixed to a circular plate $b^2$. The plate $b^2$ is mounted upon the hub $a^2$ and is made quite thick, so as to obtain a good and sufficient bearing thereon. A bushing $b^3$ is preferably interposed between the plate $b^2$ and hub $a^2$, which extends from side to side of the plate, and said bushing has formed on its inner end an outwardly extended flange $b^4$, which occupies a position between the plate $b^2$ and spur gear $a'$. At the opposite side of the spur gear $a'$ another plate $c$ is located, which is mounted on the hub $a^4$ and is shaped to afford bearings for the ends of the fixed studs $b'$ which extend through and project beyond the pinions. The studs $b'$ are fixed to this plate as well as to the plate $b^2$; hence they are supported at both ends, and are thus held in parallelism with the axis of the driving shaft $a$, so that the pinions $b$ will at all times correctly engage the spur gear. The said studs furthermore serve as a means for rigidly connecting the two plates $b^2$ and $c$ together, to thereby form a frame or carrier for the pinions. As the plate $c$ is mounted on the hub $a^4$ of the spur it overlies the end of that portion of the gear which extends beyond the hub, and as the plate $b^2$ is mounted on the hub $a^2$ of the spur gear, it overlies the opposite end of that portion of said gear extending beyond the hub, and hence the pinions and gear are held from endwise movement relative to each other.

As the spur gear is rigidly connected with the driving shaft $a$ it is always revolved with said shaft in the same direction, and while revolving the several pinions are revolved on their studs in directions opposite to the direction of rotation of the spur gear or are moved rotarily with the spur gear about the axis of the driving shaft $a$ in the same direction said spur gear is revolving or are revolved on their studs and also moved rotarily about the axis of the driving shaft $a$, as will be described.

The pinions $b$ also engage the teeth of an internal gear $d$, which is provided with a hub $d'$ and which is secured to the driven shaft $e$ by a set screw $d^2$ extended through the hub. The driven shaft $e$ terminates substantially flush with the inner face of the crown of the internal gear. The internal gear is adapted to be revolved by the pinions to thereby rotate the driven shaft $e$ to which it is connected, either forwards or backwards, or said internal gear may remain idle; as for instance, when the pinions are revolved on their bearings in directions opposite to the direction of rotation of the spur gear, said internal gear will be moved backwards or in a direction opposite to the direction of rotation of the driving shaft; and when said pinions are moved rotarily about the axis of the driving shaft $a$, with and by the spur gear, in the same direction said spur gear is revolving, said internal gear will be moved forwards or in the same direction the driving shaft is revolving; and when said pinions are revolved on their bearings and also moved rotarily about the axis of the driving shaft $a$, said internal gear will remain idle.

The internal gear fits the cylindrical body of a case which is made large enough to inclose all the gearing, and said gear is free to revolve in said case or to turn with said case according to whether it is disconnected from or connected with said case. The toothed portion of the internal gear is disposed in parallelism with the axis of the pinions and terminates substantially flush with the outer ends of said pinions. The cylindrical body of the case comprises a cylindrical wall $f$ and an end wall $f'$ formed integral therewith, and the latter has a central hole through it which receives loosely the hub $d'$ of the internal gear. The cylindrical wall $f$ extends beyond the outer ends of the pinions and engages the plate $b^2$, and is rigidly secured to said plate $b^2$ by screws $f^2$, or other means. Thus the plate $b^2$ serves as the outer end wall of the inclosing case for the gearing and also as a means for rigidly connecting the frame bearing the pinions with the inclosing case. As the bearings or supports for the pinions are thus connected with the inclosing case it will be seen that when said case is free to revolve the pinions may move rotarily about the axis of the driving shaft $a$, with or by the spur gear, and when said case is held at rest said pinions will revolve on their axes and will not move rotarily about the axis of the driving shaft.

The hub $d'$ of the internal gear has a cylindrical portion $d^3$ next its crown upon which one end of the inclosing case is mounted, and a screw-threaded portion $d^4$, at or near its outer end, which receives upon it an adjustable collar $h$.

A circular plate $h^{10}$ is placed upon the cylindrical portion $d^3$ of the hub $d'$, against the end wall $f'$ of the case, and is held against independent rotation and permitted to slide longitudinally thereon by means of keys $g'$, which are secured to the hub and project radially therefrom and enter keyways formed in the hub of said plate $h^{10}$. The plate $h^{10}$ is designed and intended to serve as a friction clutch plate or member for engaging the case, and its sliding movement on the hub is only sufficient to enable said plate to be moved into and out of engagement with the case. As a means for moving said clutch plate $h^{10}$ into engagement with the case a circular plate $g$ is placed against said plate $h^{10}$, which is mounted loosely on a hub formed on said plate $h^{10}$, and is movable in a direction toward and from the case to thereby move the plate $h^{10}$ into engagement with the case or to permit said plate $h^{10}$ to disengage the case, when pressure upon it is relieved.

The plate $g$ is slidably connected with the case, by pins $q^2$ or otherwise, which extend through said plate and into the case. These pins are herein shown as fixed to the case, so that the plate $q$ moves on said pins when moved to operate the clutch plate $h^{10}$.
For compactness of parts, as well as to provide for protecting the plate $g$, the end wall of the case is recessed to receive said plate $g$.

When the plate $g$ is moved toward the clutch plate $h^{10}$, said clutch plate is in engagement with the end wall of the case, and the case will be connected with the internal gear, and hence with the driven shaft $e$; and when said plate $g$ is moved in the opposite direction pressure on the clutch plate $h^{10}$ is relieved and the case will be disconnected from the internal gear and hence from the driven shaft. For the purpose of moving the plate $g$ into and out of engagement with the clutch plate the collar $h$, which is mounted on the screw-threaded portion of the hub $d'$ is cut away to receive a ring $h^{20}$, which is recessed to receive the toes $i$ of levers $i'$, which are pivoted at $i^2$ and extend in the general direction of the driven shaft $e$ and engage, at their outer ends, a cone $j$. The cone $j$ is mounted loosely on the driven shaft $e$, so as to permit said shaft to revolve freely within it, yet enable it to be moved along on the shaft, which latter serves as a bearing and support for it. When the cone is moved in one direction, as for instance, in the direction of the arrow thereon, the levers will be moved outwardly on their pivots and the toes of said levers, by engaging the ring $h^{20}$, will cause the levers to act to move the plate $g$ toward and into engagement with the clutch plate $h^{10}$, and when said cone is moved in the opposite direction the levers will be released and the plate $g$ moved away from said plate. The cone $j$ is fixed to a ring $j'$, which is formed with trunnions $j^2$ which enter holes provided for them in the bent bars $k$, $k'$, of the actuating-lever, so that said ring is borne by said lever and is held from rotation. Movement of the actuating-lever operates the cone to move the friction clutch plate $h^{10}$ into and out of engagement with the case. The bent bars $k$, $k'$ of the actuating-lever are made as opposites, and at one end are bolted to a handle $k^2$ and at the opposite end are pivotally connected to the extremity of a fixed bar $m$, and the intermediate portions of said bars $k$, $k'$, are bent to inclose the ring which is connected with the cone $j$.

A brake-band is provided for the cylindrical case; which is adapted to be operated to engage and hold the case at rest or to release the case and permit it to revolve, and, as herein shown, said band is composed of two semi-circular portions $o$, $o$, shaped to embrace the case, each portion having ears $o'$, $o'$ at its opposite ends which are extended outwardly, and, which, when secured together, hold the two parts of the band in position to embrace the case. One end of the bar $m$ is located between the two ears $o'$, $o'$, of the brake-band, at one side of the case, and a bolt $m'$ passes through said ears and bar, which holds them assembled and also holds the bar $m$ in fixed position. The end of the bar *m* which is located between the ears *o'*, *o'*, is formed with oppositely inclined faces, as shown in Fig. 3, and the ears *o'*, *o'*, which engage said faces are formed with parallel faces, and as a result said ears *o'*, *o'* are held at slight angles with respect to each other, being brought nearer together at their outer ends. This tends to cause the opposite ends of said semicircular bands to separate so as to disengage the case sufficiently to permit the case to revolve freely.

To cause the brake-band to engage the case and restrain it from rotation the two semicircular portions are drawn toward each other and to accomplish this result the bolt $o^2$ which passes through the uppermost ears *o'*, *o'* is made long enough to receive upon it an arm *n* having a cam-faced boss *n'*, and said arm is arranged between the head of the bolt and one of the ears *o'*, so that the cam-faced portion of the boss engages the contiguous ear, and said arm is adapted to be turned on the bolt as an axis and when so moved its cam-faced boss acts upon one of the ears to move it toward the other ear and thereby move one of the semicircular portions into engagement with the case and also to draw the bolt longitudinally to move the other semicircular portion into engagement with the case. Thus, by turning said arm in one direction the two semicircular portions are caused to engage the case and by turning it in the opposite direction they are permitted to separate. The inherent spring action of the two semicircular portions is sufficient to permit them to be moved toward each other by the cam-faced boss to engage the case, which acts to separate said portions when the pressure of the boss upon them is relieved.

To move the arm *n* back and forth for the purpose of operating the brake-band, it is connected by a link $n^2$ with the actuating-lever $k^2$, it being bent at a point intermediate its length to enable this connection to be made.

The actuating-lever $k^2$ is designed and intended to occupy three different positions, a right, a left, and an intermediate position. When moved to its extreme left position the driving shaft will be connected with the driven shaft to turn the latter in the same direction it is revolving, and when moved into its intermediate position the driven shaft will be disconnected from the driving shaft and hence will remain at rest while the driving shaft revolves, and when moved into its extreme right position the driven shaft will be connected with the driving shaft in such manner that it is revolved in a direction opposite to the direction of rotation of said driving shaft. Therefore the driven shaft may be revolved in either direction or may remain at rest.

In the first position above referred to, with the actuating lever in its left position, as represented in Fig. 2, the clutch-plate $h^{10}$ is moved into engagement with the case, thereby connecting the case with the internal gear, which is connected with the driven shaft *e*, and the brake-band is loosened, permitting the case to revolve freely, and with the parts in this position, as the driving shaft *a* revolves, the pinions and internal gear and case will all revolve with the spur-gear, the direction of rotation being the same as the spur-gear, hence the driven-shaft *e* will be revolved in the same direction as the driving-shaft *a*. In the second position above referred to, with the actuating-lever in its "intermediate" position, the clutch-plate $h^{10}$ is disengaged from the case, thereby disconnecting the case from the internal gear and from the driven-shaft *e*, and the brake-band is loosened permitting the case to revolve freely, independently of the internal-gear, and with the parts in this position, as the driving-shaft *a* revolves, the pinions travel rotarily about the spur-gear, and also revolve on their axes in a direction opposite to the direction of rotation of said spur-gear, and the case moves about the spur-gear with the pinions, and the internal gear remains at rest and consequently the driven-shaft *e* will remain at rest while the driving shaft *a* revolves.

In the third position above referred to, with the actuating-lever in its "right" position the clutch-plate $h^{10}$ is disengaged from the case, thereby disconnecting the case from the internal gear and from the driven-shaft *e*, and the brake-band is tightened about the case to thereby hold said case at rest, and with the parts in this position, as the driving-shaft *a* revolves, the pinions revolve on their axes but do not move rotarily about the spur-gear or about the axis thereof and the internal gear is revolved by said pinions in a direction opposite to the direction of rotation of the spur gear, and the driven-shaft *e* is thereby revolved in a direction opposite to the direction of rotation of the driving-shaft *a*.

The two members *o*, *o* of the brake-band are preferably each provided with an outwardly extended lug $o^{10}$ which are adapted to rest upon fixed supports, and thereby prevent the band from turning with respect to the case whenever it is operated.

The friction clutch mechanism herein shown forms the subject matter of another application, Serial No. 439,940, filed June 23, 1908, and the brake band herein shown forms the subject matter of another application, Serial No. 439,941, filed June 23, 1908.

Having thus described my invention, what I claim as new and desire to secure by Letters Patent is:—

1. In a reverse gearing, the combination with the driving-shaft and spur-gear thereon, of pinions engaging said spur-gear, an internal gear engaged by said pinions, a driven-shaft to which said internal gear is secured, an inclosing case for the gearing, supported at one end by the driving-shaft and at the opposite end by the driven-shaft, studs extended inwardly from one end wall of said case bearing said pinions, a clutch for connecting said case with the driven-shaft, a brake-band for engaging said case to hold it at rest, an actuating lever and means for operating said clutch connected with said actuating lever, and means for operating said brake-band, also connected with said actuating-lever, substantially as described.

2. In a reverse gearing, the combination with the driving-shaft and spur-gear thereon, of pinions engaging said spur-gear, an internal gear engaged by said pinions, a driven-shaft to which said internal gear is secured, an inclosing case for the gearing supported at one end by the driving-shaft, and at the opposite end by the driven-shaft, studs extended inwardly from one end wall of said case bearing said pinions, a plate contained in the case and supported on the hub of said spur-gear to which the inner ends of said studs are secured, a clutch for connecting said case with the driven-shaft, and a brake-band for engaging said case to hold it at rest, an actuating lever and means for operating said clutch connected with said actuating-lever, and means for operating said brake-band also connected with said actuating-lever, substantially as described.

3. In a reverse gearing, the combination with the driving-shaft and spur-gear thereon, of pinions engaging said spur-gear, an internal gear engaged by said pinions, a driven-shaft to which said internal gear is secured, an inclosing case for the gearing supported at one end by the driving-shaft and at the opposite end by the driven-shaft, studs extended inwardly from one end wall of said case bearing said pinions, a clutch-plate mounted on the hub of the internal gear which is movable toward and from the case, a brake-band surrounding the case, an actuating-lever and means for operating said clutch-plate connected with said actuating-lever and means for operating said brake-band also connected with said actuating-lever, substantially as described.

4. In a reverse gearing, the combination with a driving-shaft and spur-gear thereon, of pinions engaging said spur-gear, an internal gear engaged by said pinions, a driven-shaft to which said internal gear is secured, an inclosing case for the gearing supported at one end by the driving-shaft and at the opposite end by the driven-shaft, studs extending inwardly from one wall of said case upon which said pinions are mounted, a plate to which the inner ends of said studs are secured, which is supported upon the driving-shaft, whereby the studs supporting the pinions are supported at both ends and held in parallelism with the driving-shaft, means for connecting said case with and disconnecting it from the driven-shaft, and means for engaging said case to hold it at rest, substantially as described.

5. In a reverse gearing, the combination with a driving-shaft and spur-gear thereon, of pinions engaging said spur-gear, an internal gear engaged by said pinions, a driven-shaft to which said internal gear is secured, an inclosing case for the gearing supported at one end by the driving-shaft and at the opposite end by the driven-shaft, studs extending inwardly from one wall of said case upon which said pinions are mounted, a plate to which the inner ends of said studs are secured which is supported upon the driving-shaft and which overlies the spur-gear, whereby the studs supporting the pinions are supported at both ends and held in parallelism with the driving-shaft and the pinions and gear are held from endwise movement relative to each other, means for connecting said case with and disconnecting it from the driven-shaft, and means for engaging said case to hold it at rest, substantially as described.

6. In a reverse gearing, the combination with a driving-shaft and spur-gear thereon, of pinions engaging said spur-gear, an internal gear engaged by said pinions, a driven-shaft to which said internal gear is secured, an inclosing case for the gearing, bearings for said pinions and means supporting both ends of said bearings which are connected with said case, means for preventing endwise movement of the pinions and gear relative to each other, means for connecting said case with and disconnecting it from the driven shaft, and means for engaging said case to hold it at rest, substantially as described.

7. In a reverse gearing, the combination with the driving-shaft and spur-gear rigidly secured thereto, of pinions engaging said spur-gear, an internal gear engaged by said pinions, a driven-shaft to which said internal gear is rigidly secured, an inclosing case for the gearing supported at one end by the driving-shaft and at the opposite end by the driven-shaft, studs extending inwardly from one end wall to said case, upon which said pinions are mounted, which are disposed in parallelism with the driving shaft, a clutch, means for moving it to connect said case with the driven-shaft, a brake, and means for moving it to engage said case and hold it at rest, substantially as described.

8. In a reverse gearing, the combination of a driving-shaft, a spur gear thereon, means for holding said spur gear against endwise movement of the shaft, pinions engaging said spur gear, bearings therefor disposed in parallelism with the driving-shaft, means for holding said bearings in parallelism with the driving shaft and against endwise movement, an internal gear engaged by said pinions, a driven shaft bearing said internal gear, means for holding said internal gear on said driven shaft against endwise movement, an inclosing case for the gearing supported at one end by the driving shaft and at the opposite end by the driven shaft, means for holding said inclosing case against endwise movement, a clutch, means for moving it to connect said case with the driven shaft, a brake and means for operating it to engage said case and hold it at rest, substantially as described.

9. In a reverse gearing, the combination with the driving-shaft and spur-gear rigidly secured thereto, of pinions engaging said spur-gear, an internal gear engaged by said pinions, a driven-shaft to which said internal gear is rigidly secured, an inclosing case for the gearing supported at one end by the driving-shaft and at the opposite end by the driven-shaft, bearings for said pinions connected with the case, means borne by the driving-shaft for preventing endwise movement of the pinions and gear relative to each other, means for connecting said case with and disconnecting it from the driven-shaft, and means for engaging said case to hold it at rest, substantially as described.

In testimony whereof, I have signed my name to this specification, in the presence of two subscribing witnesses.

HENRY A. TUTTLE.

Witnesses:
   RUTH I. MACOMBER,
   FREDERICK C. BURBANK.